Jan. 21, 1969  C. T. REYNER  3,423,082
CLAMPING FRAMES

Filed June 18, 1965  Sheet 1 of 2

INVENTOR
CHARLES T. REYNER

BY Whitemore, Hulbert & Belknap

ATTORNEYS

Jan. 21, 1969    C. T. REYNER    3,423,082
CLAMPING FRAMES
Filed June 18, 1965    Sheet 2 of 2
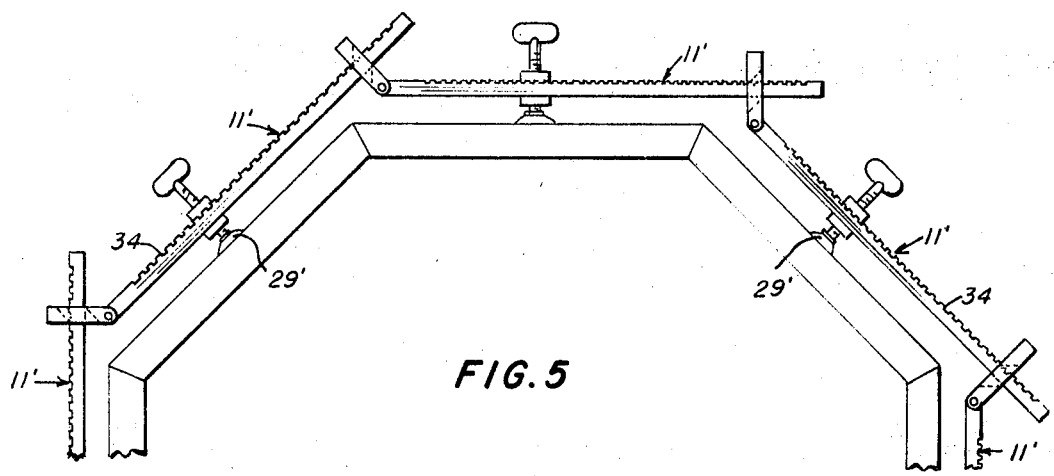
FIG. 5
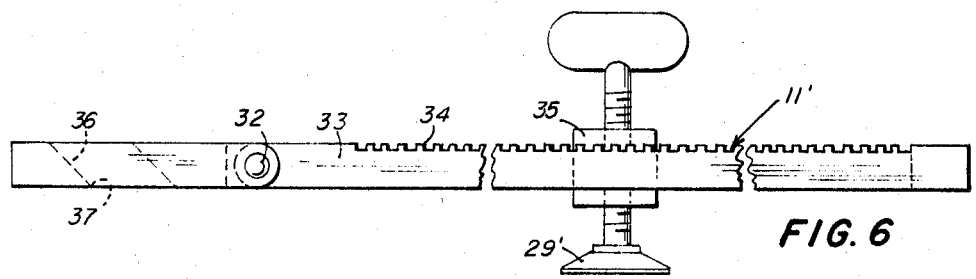
FIG. 6
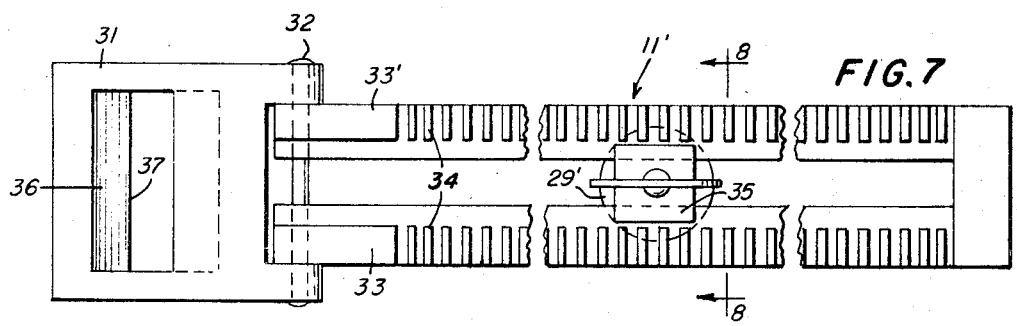
FIG. 7
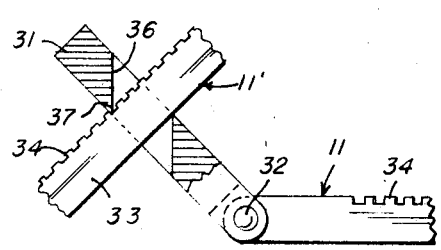
FIG. 9
FIG. 8
INVENTOR
CHARLES T. REYNER
BY Whittemore, Hulbert & Belknap
ATTORNEYS United States Patent Office 3,423,082
Patented Jan. 21, 1969

3,423,082
CLAMPING FRAMES
Charles T. Reyner, 4118 23rd St. N.,
Arlington, Va. 22207
Filed June 18, 1965, Ser. No. 465,071
U.S. Cl. 269—104    3 Claims
Int. Cl. B25b 5/14, 11/02, 5/04

ABSTRACT OF THE DISCLOSURE

The invention relates to a clamping frame comprising individual, separable arms with means to connect them in angular relation. The frame may be assembled with three or more arms to surround work pieces having three or more sides of equal or variable lengths. An adjustable clamp is attached to each arm for engagement with the work piece.

---

The present invention relates to clamps and more particularly to a clamp for jointed structures, furniture, or other objects in which separate members are connected to each other by mitered joints. Merely by way of example, the clamp to be described in the following disclosure is illustrated as holding a wood structure composed of several contiguous side members glued to one another at mitered joints, but the clamp is readily adapted to other uses.

One of the objects of the invention is to provide a series of individual similar and interchangeable clamping elements adapted to be adjustably interlocked with one another to form a complete clamp frame surrounding the work.

Another object of the invention is to provide a series of clamping elements which are angularly adjustable with respect to one another, thus adapting the complete clamp frame to hold work pieces composed of three or more sides either of equal or unequal lengths.

Other objects will be aparent from the following description taken with the accompanying drawings in which FIG. 1 is a plan view of an assembled clamp cooperating with a multi-sided work piece having mitered joints;

FIG. 5 is a partial view of another form of assembled clamping elements;

FIG. 6 is a top view, partly broken, of one of the elements shown in FIG. 5;

FIG. 7 is a front elevation of the element shown in FIG. 6;

FIG. 8 is a sectional view taken on line 8—8 of FIG. 7; and

FIG. 9 is a partial view, partly in section, illustrating the interlock between two of the elements shown in FIG. 5.

Figure 1:
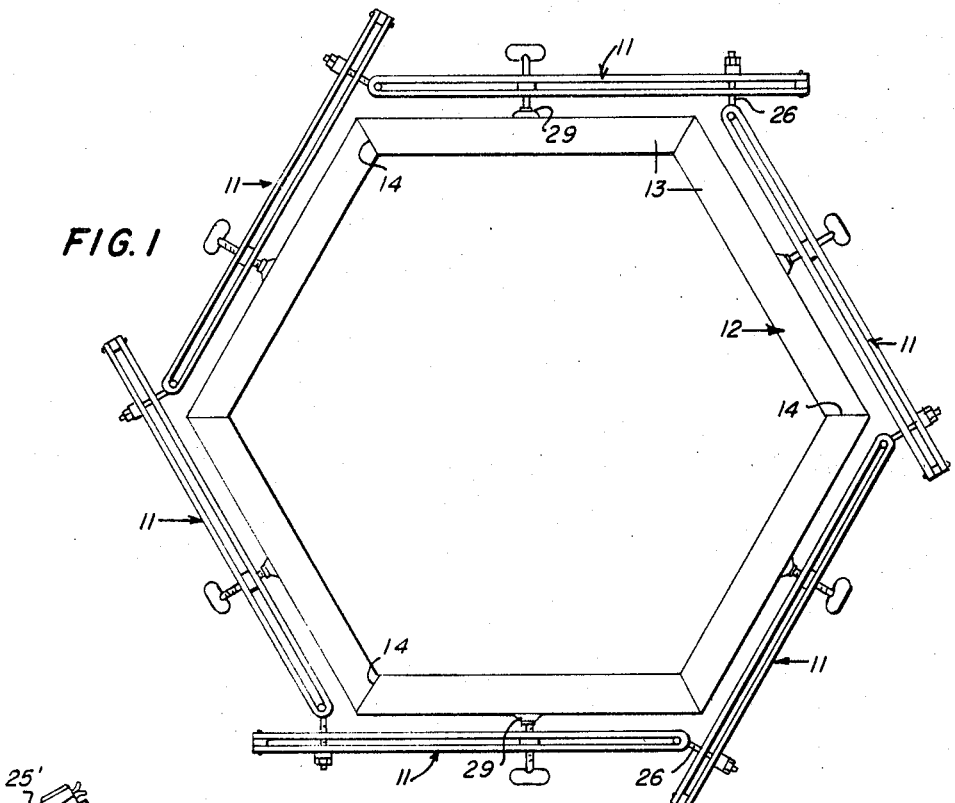
Figure 2:
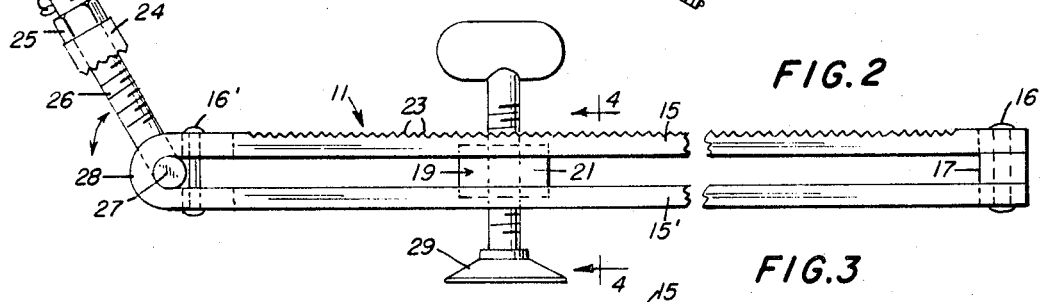
FIG. 2 is a top view, partly broken, of one form of one of the clamping elements.

Referring to FIG. 1 of the drawings it will be seen that a series of similar and interchangeable arms 11 are assembled in the form of a frame in surrounding relation to a work piece 12 composed of side members 13, the ends of which are cut at an angle and meet at mitered joints 14. Each of the arms, as seen in FIG. 2, is formed of strap iron and bent to form a pair of parallel legs 15, 15', the free ends of which are connected by rivets 16 and held in parallel relation by a spacer 17. Each of the legs 15, 15' is formed with a longitudinal slot 18 to accommodate a slidable nut 19 having reduced portions 21, the width of which is slightly less than the space between the legs. The wider central portion of nut 19 provides shoulders 22 which engage the transverse faces of slot 18.

The outer face of leg 15 is serrated to provide a series of closely spaced ribs or projections 23 extending longitudinally of the arm and adapted to cooperate with a similarly ribbed plate 24 held by a nut 25 threaded on T-bolt 26 and permanently secured by pin 25'. Plate 24 is rotatable to a position parallel to legs 15, 15' for insertion through slot 18 during assembly of the arms. The head 27 of the bolt is rotatably disposed in the bend 28 of the clamping element. Rivet 16' holds head 27 in position in bend 28. Threaded in nut 19 is an adjustable clamp element 29. This element is movable with slidable nut 19 so that it may engage the work at any desired portion of the workpiece but preferably at a mid-point of each side thereof.

As will be seen in FIG. 1, the T-bolts and plates 24 are positioned and tightened by nut 25 at a suitable location along arms 11 to assemble the arms in such a manner that they are parallel to but in closely spaced relation to the sides of the work. The individual clamping elements 19 are then rotated to bring them into firm engagement with the sides of the work.

Although the form of the invention just described is illustrated as being applied to a picture frame or similar structure having six sides, it is readily adaptable for three, four, or any number of sides since the arms are interchangeable and adjustably interlocked. At the same time the angular relation and effective lengths of the arms may be modified to meet specific requirements.

Figure 3:
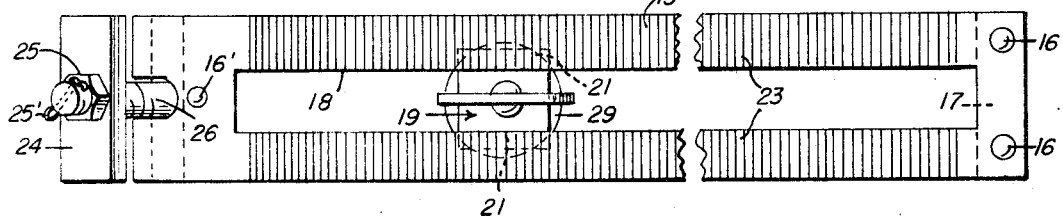
FIG. 3 is a front elevation of the element shown in FIG. 2.
Figure 4:
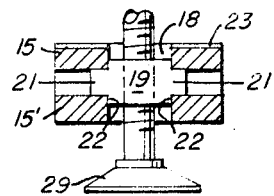
FIG. 4 is a sectional view taken on line 4—4 of FIG. 2.

The embodiment of the invention disclosed in FIGS. 5 through 9 further illustrates the adaptability of the clamping apparatus to a multi-sided work piece. In this form of the invention the T-bolt shown in FIGS. 1 through 4 is replaced by swingable latch plate 31 pivoted on pin 32. Arm 11' comprises a single width metal member having transversely spaced legs 33, 33' having spaced ribs or projections 34 extending longitudinally of the arm thereof. Pin 32 is accommodated in bearings in the plate and ends of the arm. Nut 35 is H-shaped and is slidable in the rails formed by the opposed inner edges of the legs, the ribs 34 extending only partly across the faces of the legs to permit sliding movement of nut 35. Latch plate 31 is provided with transverse angular opening 36 providing a knife edge 37 adapted to cooperate with the ribs 34. A threaded clamp 29', similar to that shown in FIGS. 2 and 3, is adjustable with respect to nut 35 to permit firm engagement thereof with the work piece.

It will be apparent that the several individual arms are readily detachable from one another and can be stored compactly in parallel relation. Further there are no removable parts on the individual arms, each being a unit in itself.

While the preferred embodiments of the invention have been shown as cooperating with a work piece which may be a frame for a picture or a mirror, it is apparent that its use may be extended to other operations such as furniture, concrete forms, and the like. It is, therefore, not intended to limit its use to the form of work disclosed in the drawings. It is also contemplated that suitable changes may be made in the forms of interlocking elements shown and which fall within the terms of the appended claims.

I claim:

1. A clamping frame, adapted to surround a work piece comprising a plurality of three or more arms, each of said arms having a plurality of transverse projections spaced longitudinally of the arm and extending substantially the length thereof, a latch member extending from and swingable about one end of each of said arms, said latch member being provided with a transverse inclined slot, the edge of said slot forming a knife engageable with a selected one of said projections on a contiguous arm of said frame to interlock said one arm to said contiguous arm, and a clamping member carried by each of said arms and engageable with said work piece.

2. A clamping frame adapted to surround a work piece comprising a plurality of three or more arms, each of said arms having a plurality of projections spaced longitudinally of the arm, a swingable latch member attached to one end of each arm and cooperating with a selected one of said projections on a contiguous arm to interlock said one arm to said contiguous arm in angular relation thereto, each of said arms having a slot extending longitudinally thereof, a nut slidably mounted in said slot, and a clamping member extending through said slot and threaded in said nut, said clamping member being engageable with said work piece.

3. A clamping frame as defined in claim 2 in which said swingable member is provided with a transverse inclined slot, the edge of the slot forming a knife edge engageable with one of said projections.

References Cited

UNITED STATES PATENTS 1,662,757   3/1928   Newton _____ 269—285

FOREIGN PATENTS 611,344   3/1935   Germany.

ROBERT C. RIORDON, *Primary Examiner.*

U.S. Cl. X.R.

269—111